INVENTORS
GEORGE J. FLYNN
HOWARD H. HILL
BY
ATTORNEY

April 4, 1967 G. J. FLYNN ETAL 3,312,837

TRAPEZOIDAL WAVEFORM GENERATOR

Filed April 8, 1964 2 Sheets-Sheet 2

INVENTORS
GEORGE J. FLYNN
HOWARD H. HILL
BY Alfred H. Rosen
ATTORNEY

United States Patent Office 3,312,837
Patented Apr. 4, 1967

3,312,837
TRAPEZOIDAL WAVEFORM GENERATOR
George J. Flynn, Boston, and Howard H. Hill, Northborough, Mass., assignors, by mesne assignments, to Honeywell Inc., a corporation of Delaware
Filed Apr. 8, 1964, Ser. No. 358,249
10 Claims. (Cl. 307—88.5)

This invention relates to electrical apparatus and more particularly to electrical devices for generating voltage waveforms.

In pulse circuitry, particularly for use with reactive loads such as core memories, it is often desirable to provide pulses of substantially trapezoidal shape in which the pulse duration and the slopes of the leading and trailing edges of a pulse are all independently determined. More particularly such pulses should have "flat tops" (e.g. steady state maximum voltages) and preferably the leading and trailing edges should be of the linear ramp type. The use of integrating circuits, such as the Miller integrator, for pulse shaping is well known. However, as the need for significantly higher pulse repetition rates has grown, efforts have been made to redesign known circuits for use with transistors to take advantage of the short response times of the latter. In using transistors at megapulse repetition rates it has been found that in many circuits, the transistor storage time is so large as to cause variations in pulse width according to the magnitude of a control current where the latter is intended to decide the rise or decay times of the pulse, as in the Miller integrator. This interaction of controls is considered, for precise pulse shaping, quite undesirable.

It is therefore a principal object of the invention to provide a high speed pulse generator which will provide pulses of trapezoidal nature in which the pulse width and the slopes of the leading and trailing edges are all independently determinable. Another object of the present invention is to provide a waveform shaper for converting a substantially rectangular waveform into a trapezoidal waveform in which the waveform duration and the slopes of the leading and trailing edges are adjustable without interaction, and where the final or quiescent value of the output is stable and precise. Yet other objects of the present invention are to provide a waveform shaping circuit in which the output stage is a Miller integrator employing a saturating transistor to achieve final voltage stability; to provide such a waveform shaper in which the circuitry supplementing the integrator allows a wide range of output parameter adjustment while closely controlling the turn-on delay, degree of saturation, and saturation delay; and to provide such a waveform shaping circuit which generates a substantially linear, high speed trapezoidal waveform with a low output impedance and a high drive capability; and to provide such a circuit in which transistor storage delays and waveform overshoot and undershoot have been considerably reduced.

Other objects of the present invention will in part be obvious and will in part appear hereinafter. The invention accordingly comprises the apparatus possessing the construction, combination of elements, and arrangement of parts which are exemplified in the following detailed disclosure; and the scope of the application of which will be indicated in the claims. For a fuller understanding of the nature and objects of the present invention, reference should be had to the following detailed description taken in connection with the accompanying drawing wherein:

Figures 1, 2:
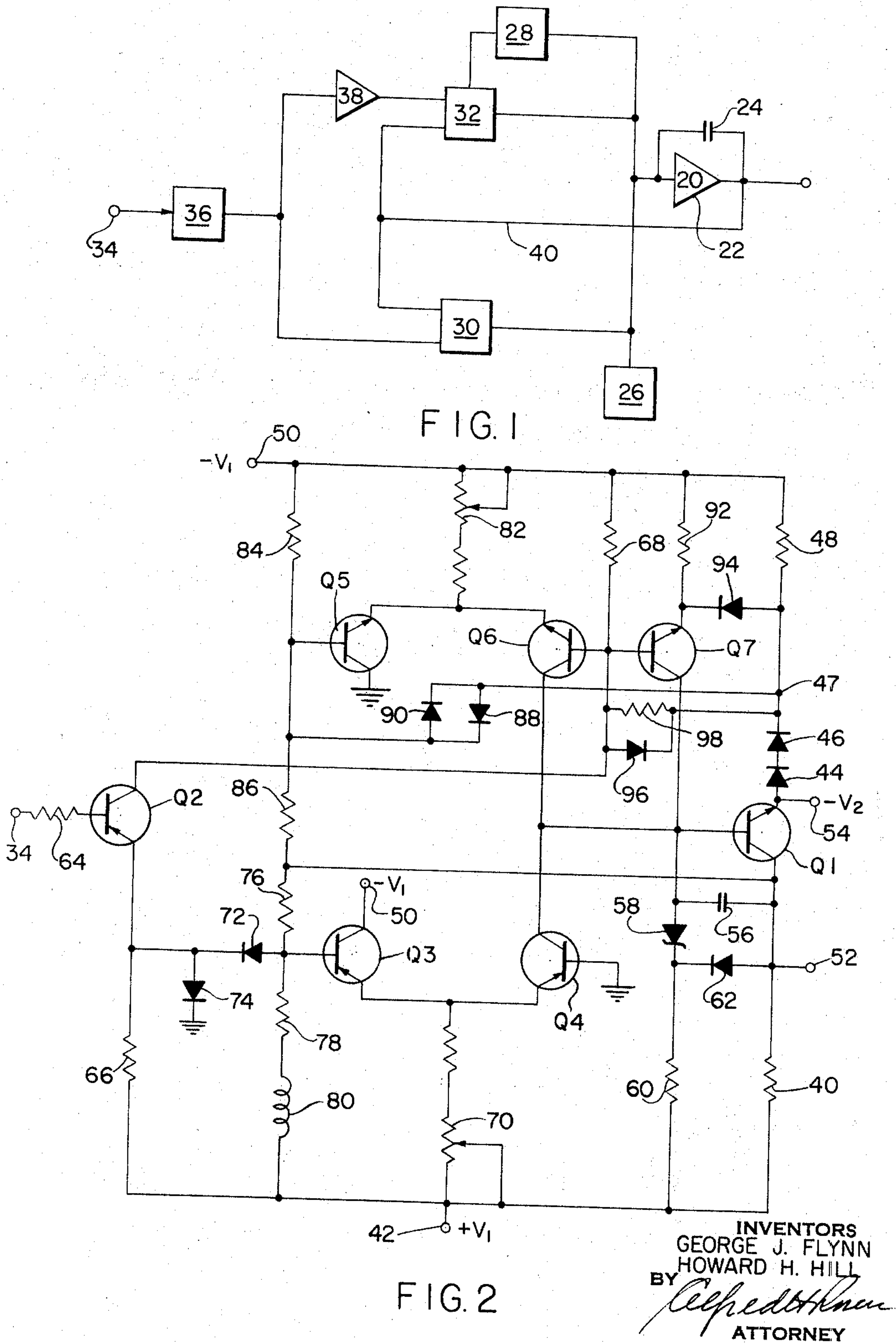
FIG. 1 is a schematic block diagram showing a generalized embodiment of the present invention.
FIG. 2 is a schematic circuit diagram of one form of the present invention.

The waveform generator of the present invention employs an integrating circuit which in FIG. 1 is shown at 20 as high-gain inverting amplifier 22 having capacitive feedback loop 24 between its output and input. As is known, such circuits are operational amplifier devices capable of integrating in the time domain, and typically in response to step or discontinuous input change in voltage has an output in the form of an inverse, substantially linear ramp. Integrator 20 is preferably a grounded emitter transistor inverter with collector-to-base feedback capacitance and is more commonly known as a Miller integrator. Ordinarily, when a collector-to-base feedback capacitor is used in an inverter stage, the circuit will generate a linear ramp with a calculable rise time in response to a step input, provided that the input current is substantially constant, the output loading is not excessive, the capacitor charging current is large compared with the base current needed by the integrator transistor, and the feedback capacitor is much larger than the inherent collector-to-base capacity of the integrator transistor.

The same conditions are major considerations in the design of linear high speed ramp generators (e.g. capable of providing pulses at a repetition rate of up to 20 megapulses per second in which the pulse waveforms have controlled rise times as small as 10 nanoseconds), particularly in view of the fact that the collector-to-base capacity of transistors tends to vary as a function of the collector-to-base voltage. In order to generate ramp functions in the present invention using presently available transistors, sufficient overdrive "turn-on" current is supplied to the integrator to minimize the inherent transistor collector current "rise-time." The external collector-to-base capacitance of loop 24 is preferably in the range of 15–25 picofarads or larger, because the inherent collector-to-base capacitance of high speed switching transistors is approximately 2–4 pf.

When the above conditions are satisfied, the output of the integrator will be a linear high speed ramp until the transistor bottoms or saturates and the collector voltage is clamped to the emitter voltage. Thereafter, the capacitor charging current is shunted into the transistor, appearing as additional base current to the later, and the transistor will be overdriven. The overdrive condition will result in a storage problem or saturation delay in the integrator transistor. If the circuit is driven to a substantially constant circuit $\beta$ and the transistor $\beta$ is a loosely controlled parameter, as in standard production units, the storage time will vary from unit to unit and the integrator output will poorly approximate the input pulse width. Additionally, as previously noted the storage time problem is frequently complicated by adjustments used in attempting to control the rise and fall times, which adjustments also interact and provide variation in pulse width.

Since the overdrive current is needed only during the rise or fall time of the integrator and the presence of these currents is detrimental at other times, the circuit of FIG. 1 includes individual and separately current controllable sources for controlling each edge or margin of the waveform.

To this end, the embodiment of the invention as shown generally in FIG. 1, includes four current sources; a first source of constant current or "ON" current source 26; a second source of a gated current or "OFF" current source 28; a gated current source for controlling the slope of one of the leading or trailing edges of the output pulse waveform, or rise-time control circuit 30; and another gated current source for controlling the slope of the other of the leading or trailing edges of the output pulse waveform, or fall-time control circuit 32.

The invention is intended to provide a trapezoidal form of pulse based upon an input control or logic signal, such as a rectangular or square wave which can be typically provided as from a precision flip-flop or other know bistable devices. Thus, the invention includes input terminal means 34 adapted for connection to a source of input square wave pulses. A buffer stage, such as means 36, is preferably included for providing impedance isolation between the current sources and the square wave generator when the latter is applied to terminal means 34. The output of buffer 36 is applied to one of two inputs of rise-time control circuit 30, and is also applied through inverter 38 to one of two inputs of fall-time control circuit 32. Each of circuits 30 and 32 also includes a respective inhibit input terminal connected through D.C. feedback path 40 to the output of integrator 20. The output of both circuits 30 and 32 are connected to the input of integrator 20. "OFF" current source 28 has a control input thereof connected to the output of inverter 38, and has its output connected to the input of integrator 20. "ON" current source 26 has its output connected to the input of integrator 20.

In operation, "OFF" current source 28, in the absence of a control or logic signal at terminal means 34, is intended to provide a steady-state current to the input of the integrator, and therefore the integrator output is also steady state at a level determined by source 28. When a logic signal or square wave is applied at terminal means 34, the leading edge thereof is applied to a control terminal of rise-time control circuit 30, and turns the latter on to provide an overdrive current. When the leading edge of the input pulse at terminal means 34 is applied to gate circuit 30 on, an inverted signal is also applied to control current source 28 turning the latter off. The same inverted signal is applied to the fall-time control circuit but is not of the requisite polarity to turn circuit 32 "on." The current from source 26 is summed together with the overdrive current from circuit 30 and applied to the input of the integrator. The voltage ramp provided at the integrator output has a slope which, as is well known in the art, is a function of the magnitude of the input current and of feedback capacitance 24. Feedback loop 40 samples the magnitude of the output of the integrator such that when the latter reaches a predetermined level, the feedback along loop 40 inhibits circuit 30, gating the latter "off" so as to arrest the overdrive current.

When circuit 30 is gated "off" by the signal along feedback loop 40, the substantially constant current from source 26 is still applied to the input of integrator 20 maintaining the latter in an "on" condition.

Now, when the trailing edge of the input pulse appears at terminal means 34, it is applied, in inverted form (and therefore is going toward the correct polarity) to gate circuit 32 "on" and to turn source 28 back "on." Source 32 then provides a step current change opposite to that previously provided by current source 30. This step current, when applied at the input of integrator 20 (summed with, of course, the currents from sources 26 and 28) provides a ramp in the output voltage of integrator 20. When the ramp output bottoms, or reaches its predetermined quiescent level, the sampling thereof along feedback path 40 inhibits circuit 32, turning it "off." The current provided by source 28 is of greater magnitude than the current from source 26 and the net current thus is a constant holding the integrator output at a steady level. This returns the entire circuit back to its original state.

It will be appreciated that the integrator is overdriven by controllable large currents from circuits 30 and 32 respectively only during the rise and decay times of the output trapezoidal pulse. During the steady state portions of the output pulse there are provided minimal currents which are sufficient merely to maintain the steady state conditions. Thus the pulse width (i.e. the pulse duration from initial rise to initial decay) is controlled by the pulse width of the logic signal or square wave applied at terminal means 34, the slope of the leading and trailing edges of the integrator output waveform are independently controllable by individual current supply circuits, and the stability of the steady state levels of the output waveform are each determined by individual, substantially constant current sources which can be set to provide predetermined values of current.

The general principles of the invention thus described and their applicability to transistor circuitry is particularly illustrated in the detailed embodiment of the present invention shown in FIG. 2. As an integrator means, the circuit of FIG. 2 includes transistor Q1 shown as an NPN type having its collector connected through resistor 40 to terminal 42. Terminal 42 is adapted to have a positive voltage, $V_1$, applied thereto. The emitter of transistor Q1 is connected to the anode of diode 44, the cathode of the latter being connected to the anode of another diode 46. The cathode of diode 46 in turn is connected through junction joint 47 to resistor 48 and thence to terminal 50. Terminal 50 is adapted to have applied thereto a negative voltage, $-V_1$. Additionally, the collector and emitter of transistor Q1 are respectively connected to terminals 52 and 54. Terminal 52 is intended to constitute an output terminal for the desired waveform, and terminal 54 is adapted to have applied thereto another negative voltage, $-V_2$, intermediate in value between ground and $-V_1$. The base and collector of transistor Q1 are connected to one another by a feedback loop which includes capacitance 56. The base of transistor Q1 is also connected to the anode of Zener diode 58, the cathode of the latter being connected through resistor 60 to terminal 42. The cathode of diode 58 is also connected to the cathode of diode 62, the anode of the latter being connected to the terminal 52.

Resistor 60 can be considered as means for supplying a substantially constant "HOLD-ON" current which is equivalent of source 26 of the embodiment of FIG. 1.

As inverting and buffering means, the embodiment of FIG. 2 includes transistor Q2, shown as a PNP type, preferably of the high speed switching variety having its base connected through resistor 64 to input terminal 34. The emitter of transistor Q2 is connected through resistor 66 to terminal 42, and the collector of transistor Q2 is connected through resistor 68 to terminal 50.

The rise-time control circuit of FIG. 2 is formed as a current-mode type flip-flop of transistors Q3 and Q4. Both the latter are of the PNP type having coupled emitters which are in turn coupled through a variable resistance such as potentiometer 70 to positive voltage supply terminal 42. The base of transistor Q4 is connected to ground while the base of transistor Q3 is connected through diode 72 to the emitter of transistor Q2 and also to the anode of diode 74. The cathode of the latter is connected to ground. The base of transistor Q3 is also connected through the junction of resistors 76 and 78 which are in series between the collector of transistor Q1 and terminal 42. A small reactance, such as inductance 80 is inserted in the circuit between terminal 42 and resistor 78. It will be seen that resistor 76 and 78 together constitute a voltage divider connected to a feedback path from the output of transistor Q1.

The collector of transistor Q3 is connected to the terminal such as 50 at which a negative voltage of the magnitude of $-V_1$ is adapted to be applied. The collector of transistor Q4 is connected to the base of transistor Q1.

The fall-time control circuit of the embodiment of FIG. 2 is also in the form of a current-mode type flip-flop which comprises a pair of NPN transistors Q5 and Q6 having emitters coupled together and connected to terminal 50 through a variable resistor such as potentiometer 82. The collector of transistor Q5 is grounded and the collector of transistor Q6 is connected directly to the base of transistor Q1. The base of transistor Q5 is connected to the junction of a pair of resistors 84 and 86 which are connected in series between terminal 50 and the collector of transistor Q1 thereby forming a voltage divider network in the output of transistor Q1. The base of transistor Q5 is also connected through a pair of paralleled diodes 88 and 90, connected anode to cathode, to junction point 47 in the emitter circuit of transistor Q1. The base of transistor Q6 is connected directly to the collector of transistor Q2.

As a source of the steady state "HOLD-OFF" current (which is the equivalent of source 28) there is included yet another transistor Q7, shown as an NPN type, having its collector coupled to the base of transistor Q1, its base connected to the collector of transistor Q2 and its emitter connected to terminal 50 through resistor 92. The emitter of transistor Q7 is also connected to the cathode of diode 94, the anode of the latter being connected to the junction point 47. The base of transistor Q7 is also connected to the anode of diode 96, the cathode of the latter also being connected to junction point 47. Diode 96 is paralleled by resistor 98. Diodes 90 and 94 are preferably of the silicon variety; the other diodes in the circuit, except diode 58, are germanium. The choice of diode semiconductor material is dictated by the particular operating biases desired.

The operation of the embodiment of FIG. 2 can be advantageously described in connection with exemplary waveforms shown in FIG. 3. All of the waveforms shown in FIG. 3 somewhat idealized for the sake of clarity, are expressed along the same horizontal time axis, and are individually identified with exemplary peak or base line polarities. As will be seen in FIG. 3 there is intended to be applied at terminal 34 a signal control voltage pulse shown as waveform A and having, for example, a peak-to-peak excursion of 4 volts, for example, from a base line value of —4 volts.

Assuming that the voltage levels $V_1$ and $V_2$ of the circuit of FIG. 2 are respectively 12 and 6 volts of appropriate polarity, at the steady state —4 volt level of input voltage ($-V_3$ as shown in waveform A) transistor Q2 will be in a conductive state and current therefore flows in its emitter-collector circuit. The negative voltage at the emitter of transistor Q2 forward biases diode 72 so that transistor Q3 is in conduction and a current flows therethrough between terminals 42 and 50. The magnitude of the latter current can be predetermined by the setting of potentiometer 70. Transistor Q4 being back biased, is in a non-conductive state. Similarly, the base of transistor Q5 will be appropriately biased and transistor Q5 will be in a conductive state such that current flows in its collector-emitter circuit between ground and terminal 50 in a magnitude determined by the setting of the potentiometer 82. The base of transistor Q5 is clamped by diode 90 to the reference voltage level at junction 47. Tranistor Q6 is back-biased and therefore non-conductive.

Transistor Q1 is preferably always in its conductive state. When the input voltage at terminal 34 is at the —4 volt level, transistor Q1 is in its quiescent state and is held there substantially by a steady state "HOLD OFF" current of predetermined magnitude (shown at $-I_4$ in waveform E of FIG. 3) generated by transistor Q7 and summed with a steady state "HOLD ON" current (shown at level $I_2$ in waveform C of FIG. 3) which is provided by resistor 60. Inasmuch as the HOLD OFF current is of larger magnitude than, and of opposite polarity to the HOLD ON current there is a net steady state current provided by the collector of transistor Q7 to drive the base of transistor Q1, so that the collector of the latter seeks a positive, quiescent level. This causes diode 62 to conduct and clamp the collector of Q1 (and thus terminal 52) at a voltage determined by Zener diode 58, for example —1 volt. Thus, transistor Q1 is conductive and its collector voltage is at the quiescent level of —1 volt (shown as the $-V_4$ level in waveform F) when terminal 34 is at the —4 volt level.

The pair of diodes 44 and 46, in conjunction with resistor 48 are included to provide proper voltage level shifting so that junction point 47 is maintained at a desired reference voltage level. This latter level, in connection with diode 96 and paralleled resistor 98, insures that the bases of transistors Q6 and Q7 cannot be biased enough to permit the respective transistors to saturate. Thus the transistors are forced to operate in the current mode. The collector current of transistor Q2 will provide appropriate base drive to insure that transistor Q7 will continue to generate the requisite steady state HOLD OFF current. Because transistor Q6 is back-biased by the conduction of transistor Q5, the base drive to transistor Q7 will not affect transistor Q6.

When the positive-going transient of the input logic pulse (waveform A of FIG. 3) appears, it switches the rise time control circuit by turning Q2 off. Thus, Q3 can no longer conduct and turns off, while Q4 becomes forward-biased and turns on. Simultaneously, although transistor Q2 no longer provides a collector current, the current flow from junction point 47 through the voltage divider formed by resistors 98 and 68, drives the base of transistor Q7 negatively, turning the latter off as shown in waveform E of FIG. 3. The conduction of Q4 provides a positive-going step rise in its collector or the TURN ON current (shown at $+I_1$ in waveform B of FIG. 3) which is fed to the base of transistor Q1 together with the HOLD ON current (waveform C of FIG. 3) provided by resistor 60. Transistor Q1, in conjunction with feedback capacitor 56, produces a negative-going, linear ramp function at terminal 52, as determined by the magnitude of the sum of the collector current of transistor Q4 and the current from resistor 60, and the magnitude of capacitor 56. This ramp is shown in waveform F of FIG. 3.

The overdrive or TURN ON current from transistor Q4 and the HOLD ON current from resistor 60 force the collector current of transistor Q1 to increase, pulling the collector voltage negative to form the linear ramp, and back-biasing diode 62 so as to unclamp the latter. When the collector voltage of transistor Q1 rises to approximately its emitter voltage ($-V_2$), the voltage at the junction of the divider formed by resistor 76 and 78 pulls the base of transistor Q3 more negatively until transistor Q3 turns on and thus transistor Q4 turns off. The collector voltage of transistor Q1 is also sampled by the divider formed by resistors 84 and 86, and as the sampled voltage appearing at the base of transistor Q5 goes more negatively, diode 88 becomes forward biased, clamping the base of transistor Q5 at the potential of junction point 47. However, because the voltage on the base of transistor Q6 is still more negative (due to the divider action of resistors 68 and 98) than the clamped voltage at the base of transistor Q5, transistor Q6 still remains non-conductive and transistor Q5 remains in a conductive state. At this stage, the only current feeding the base of transistor Q1 is the steady state HOLD ON current provided by resistor 60, which keeps the collector voltage of transistor Q1 at a steady state value in a controlled degree of saturation.

Figure 3:
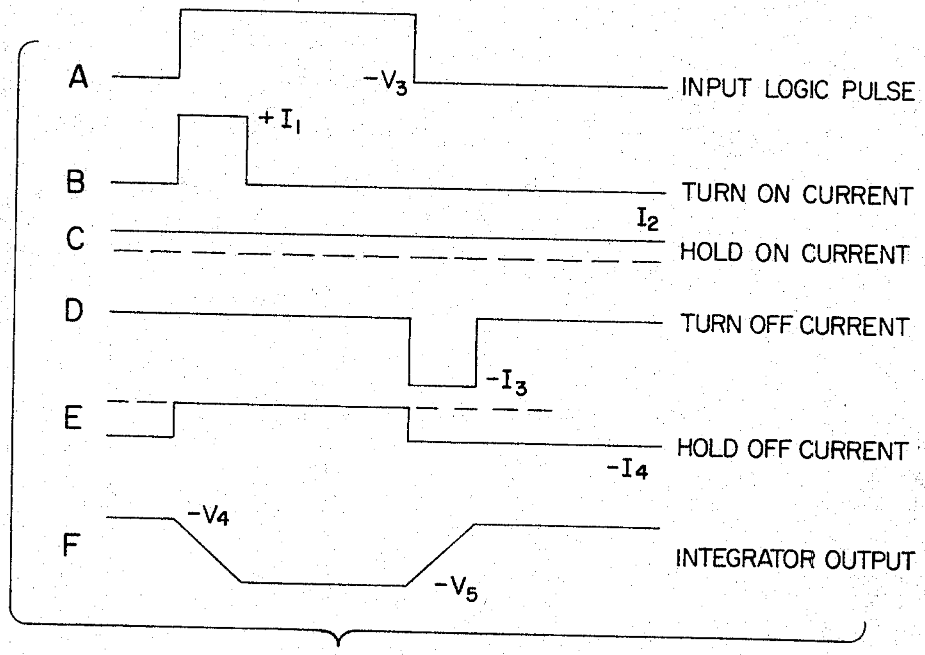
FIG. 3 is a timing diagram showing typical waveforms at various points in the embodiment of FIG. 2 during operation of the latter.

The steady state HOLD ON current therefore provides the flat top of the waveform F of FIG. 3.

When the trailing edge of the input logic pulse (waveform A) arrives at terminal 34, the negative going transient turns transistor Q2 on. This of course holds transistor Q3 and transistor Q4 in their respective on and off states. The collector current of transistor Q2 now provides a forward bias to diode 96, and the resulting current flow raises the base voltage on both transistors Q6 and Q7, turning them both on and turning transistor Q5 off. Transistor Q7 thus again provides the steady state HOLD OFF current (waveform E of FIG. 3) which is fed to the base of transistor Q1, and transistor Q6 generates an overdrive TURN OFF current as a step input as shown in waveform D of FIG. 3. The sum of the TURN OFF current provided by transistor Q6 and the HOLD OFF current provided by transistor Q7 forces the collector current of integrator transistor Q1 to decrease, pulling the collector voltage more positively in a linear ramp as shown in waveform F of FIG. 3. As is the case of the opposite ramp of the integrator output, the slope of the ramp is a function of the magnitude of the capacitance 56 and the total input current at the base of transistor Q1. When the collector voltage of transistor Q1, has reached the level where diode 62 again becomes forward-biased, thereby clamping the voltage on terminal 52 at a predetermined minimum, the voltage fed back through the divider formed by resistors 86 and 84 brings the base of transistor Q5 to a level which is sufficiently positive to turn transistor Q5 on and thus turn transistor Q6 off, abruptly terminating the TURN OFF current shown in waveform D. At this point the circuit has returned to its original state, at which the integrator output is maintained at a constant level in accordance with the substantially constant difference between the HOLD ON current provided by resistor 60 and the HOLD OFF current provided by transistor Q7. It will be appreciated that the overdrive TURN ON and TURN OFF currents provided by the respective current sources are considerably greater than the HOLD ON and HOLD OFF currents which are used to maintain integrator Q1 output at a steady state value.

The magnitude of the currents provided respectively by transistors Q4, Q6, Q7 and resistor 60 will determine the operation of transistor Q1 and can be corrected to provide very low percentage deviation from linearity. At very high speeds, in order to compensate for the inherent delay time in the circuitry, it is preferred to introduce a phase shift into the network, and this can be done by either employing an inductance such as 80, or alternatively by using a capacitance, for example across resistor 76. Similar compensation can be provided for similar delays in the operation of the fall-time control circuit.

Through the use of a trimmer resistor in conjunction with resistor 60, an optimum compromise between storage time and pulse droop can be obtained so that the "flat top" characteristic of the integrator output exhibits pulse droop of less than 1% and storage times of less than 10 nanoseconds.

The circuit of the present invention will provide excellent wave-shaping for a number of reasons. For example, turn-on and turn-off delays will be substantially constant regardless of the magnitude of the overdrive turn-off and turn-on currents inasmuch as the latter will only have to overcome the constant value of the hold-on and hold-off currents. Also, since during the rise time of the integrator, the fall time control circuit is inactive and during the fall time of the integrator the rise time control circuit is inactive; the rise and fall time control circuits function as independently controllable pulse parameters. The magnitude of the storage time will be minimal and constant since it is determined by the small current used to hold transistor Q1 in its "on" state during an input pulse, which current is considerably smaller in magnitude than the transient turn-on and turn-off currents provided by the flip-flop outputs.

It will be appreciated that with appropriate changes in transistors and polarities, an output waveform of opposite polarity can be obtained.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An electrical waveform generating device comprising in combination:

an electrical integrating means;

first, second, third and fourth current sources all connected to the input of said integrating means;

said first current source providing a substantially fixed magnitude, steady-state current to the input of said integrating means;

said second current source providing a current of substantially fixed magnitude to said input;

means for gating said third current source so as to provide therefrom a step output of current of a first polarity to said input for only a predetermined period and for substantially simultaneous gating said second current source so as to inhibit the latter from providing said fixed magnitude current to said input; and means for gating said fourth current source so as to and for substantially simultaneously gating said second current source so as to restore current flow from the latter to said input.

2. A system for generating trapezoidal-type electrical waveforms responsively to a substantially rectangular input control waveform, said device comprising, in combination a system input for said waveform:

an electrical integrator having input terminal means;

first and second separate and individual current sources disposed respectively in parallel control paths between said system input and said terminal means for providing to said input terminal means a substantially steady-state constant magnitude current responsively to a first signal level of said control waveform;

means responsive to first-direction-going transient edges of said control waveform for providing a step input of current of a first polarity to said input terminal means for a predetermined time period and for substantially simultaneously terminating said current from said first current source to said input terminal means; and means responsive to opposite-direction-going transient edges of said waveform for providing a step input of current of opposite polarity to said input terminal means for a predetermined period of time and for substantially simultaneously restoring the current from said first current source to said input terminal means.

3. An electrical device for generating trapezoidal-type waveforms, said device comprising in combination;

period control means for providing timing signals each of which includes a beginning and an ending signal embracing a predetermined time period;

first means connected to said control means which can be enabled by a beginning signal so as to provide a step output of current of one polarity;

second means connected to said control means which can be enabled by an ending signal so as to provide a step output of current of opposite polarity;

said first and second means each having respective inhibit input terminals which can be disabled by inhibiting signals of respectively different levels applied at respective inhibit input terminals so as to terminate the respective step output of current;

third means connected to said control means which can be enabled by an ending signal so as to provide a stable step output of current and which can be disabled by a beginning signal so as to terminate said stable step output;

a Miller integrator having its input connected to the outputs of said first, second and third means, the output of said integrator being connected to said inhibit input terminals; and fourth means connected to the input of said integrator for providing a steady-state stable current to said input.

4. An electrical device as defined in claim 3 wherein the currents from said fourth and third means are approximately the same order of magnitude and are each approximately an order or more of magnitude lesser than the currents from said first and second means.

5. An electrical device as defined in claim 3 wherein the amplifier portion of said integrator comprises at least one transistor.

6. An electrical device for generating trapezoidal-type waveforms, said device comprising in combination;

input terminal means which can accept timing signals each of which includes a beginning and an ending signal embracing a predetermined time period;

a first gated flip-flop connected to said input terminal means which can be enabled by a beginning signal so as to provide a step output of current of one polarity, and to be so disabled by an inhibiting signal at a first level as to terminate step output;

a second gated flip-flop connected to said input terminal means which can be enabled by an ending signal so as to provide a step output of current of opposite polarity and to be so disabled by an inhibiting signal of a different level as to terminate its step output;

a current generator connected to said input terminal means which can be enabled by an ending signal so as to provide a stable step output of current and which can be disabled by a beginning signal so as to terminate its stable step output;

a Miller integrator having its input connected to the outputs of said flip-flops and said current generator, the output of said integrator being connected to said flip-flops to provide said inhibiting signals; and another current generator connected to the input of said integrator for providing a steady-state stable current to said input.

7. An electrical device for generating trapezoidal-type waveforms, said device comprising in combination;

period control means for providing timing signals each of which includes a beginning and an ending signal embracing a predetermined time period;

a current-mode-operated flip-flop connected to said control means which can be enabled by a beginning signal so as to provide a step output of current of one polarity and to be disabled by an inhibiting signal of a first level applied at an inhibit input terminal so as to terminate its step output;

second current-mode-operated flip-flop connected to said control means which can be enabled by an ending signal so as to provide a step output of current of opposite polarity and to be disabled by an inhibiting signal, of a second level applied at an inhibit input terminal, so as to terminate its step output of current;

a transistor current generator connected to said control means which can be enabled by an ending signal so as to provide a stable step output of current and can be disabled by a beginning signal so as to terminate said stable step output;

a transistor Miller integrator having its input connected to the outputs of said flip-flops and said current generator, the output of said integrator being connected to said inhibit input terminals; and another current generator connected to the input of said integrator for providing a steady-state stable current to said input.

8. An electrical device for generating trapezoidal-type waveforms, said device comprising in combination;

a transistor integrator comprising a high-gain amplification stage having a negative feedback loop between its output and input, and a capacitive impedance in said loop;

an input terminal which can accept timing signals each of which includes a beginning and ending signal embracing a predetermined time period;

a first gated current source having control terminal means and an output terminal, its control terminal means being connected to said input terminal so that said first source is enabled by an ending signal to provide at its output terminal a stable step output of current and is disabled by a beginning signal so as to terminate its step output, its output terminal being connected to the input of said integrator;

a second gated current source having control terminal means and an output terminal, its control terminal means being connected to said input terminal so that said second source is enabled by a beginning signal to provide at its output terminal a stable step output of current, its output terminal being connected to the input of said integrator;

a feedback path connecting the output of said integrator with the control terminal means of said second source so that the latter is disabled by a first signal level representing one condition of the integrator;

a third gated current source having control terminal means and an output terminal, its control terminal means being connected to said input terminal so that said third source is enabled by an ending signal to provide at its output terminal a stable step output of current, its output terminal being connected to the input of said integrator; a feedback path connecting the output of said integrator with the control terminal means of said third source so that the latter is disabled by a second signal level representing another condition of the integrator; and means connected to the input of said integrator for providing a current for maintaining the output of said integrator at a predetermined level at least when all of said gated current sources are disabled by the respective signals during said time period.

9. A device as defined in claim 8 including means for independently predetermining the magnitudes of the respective step outputs of current of said second and third gated current sources.

10. A device as defined in claim 9 wherein the magnitude of each of the step outputs of current of said second and third current sources is about an order of magnitude or more greater than either the step output of said first current source or the current for maintaining the output of the integrator at said predetermined level.

References Cited by the Examiner

UNITED STATES PATENTS

| | | | |
|---|---|---|---|
| 3,007,055 | 10/1961 | Herzfeld | 307—88.5 |
| 3,125,694 | 3/1964 | Palthe | 307—88.5 |
| 3,144,564 | 8/1964 | Sikorra | 307—88.5 |
| 3,181,007 | 4/1965 | Hinds | 307—88.5 |

ARTHUR GAUSS, *Primary Examiner.*

J. S. HEYMAN, *Assistant Examiner.*

UNITED STATES PATENT OFFICE

CERTIFICATE OF CORRECTION

Patent No. 3,312,837 April 4, 1967

George J. Flynn et al.

It is certified that error appears in the above identified patent and that said Letters Patent are hereby corrected as shown below:

Column 8, lines 14 and 15, cancel "so as to and for substantially" and insert -- so as to provide to said input a step output of current of an opposite polarity for another predetermined period and for substantially --.

Signed and sealed this 10th day of March 1970.

(SEAL)
Attest:

Edward M. Fletcher, Jr.
Attesting Officer

WILLIAM E. SCHUYLER, JR.
Commissioner of Patents